(12) United States Patent
Sasaki et al.

(10) Patent No.: US 7,127,307 B2
(45) Date of Patent: Oct. 24, 2006

(54) GENERATION/MANAGEMENT APPARATUS OF PRODUCTION PROCESSING STRUCTURE IN FACTORY PRODUCTION MANAGEMENT SYSTEM

(75) Inventors: Kenji Sasaki, Tokyo (JP); Yoshiyuki Tsukamoto, Tokyo (JP); Akira Shima, Tokyo (JP); Kazuyuki Watanabe, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/531,428

(22) PCT Filed: Oct. 15, 2003

(86) PCT No.: PCT/JP03/13151

§ 371 (c)(1),
(2), (4) Date: Apr. 15, 2005

(87) PCT Pub. No.: WO2004/036326

PCT Pub. Date: Apr. 29, 2004

(65) Prior Publication Data

US 2006/0009869 A1    Jan. 12, 2006

(30) Foreign Application Priority Data

Oct. 16, 2002 (WO) ........................ PCT/JP02/10744

(51) Int. Cl.
*G06F 19/00* (2006.01)

(52) U.S. Cl. ............................ 700/96; 700/95; 700/99; 700/100; 700/108

(58) Field of Classification Search ................ 700/95, 700/96, 97, 99, 100, 108, 109, 110, 111, 117; 705/7, 8, 9; 702/182
See application file for complete search history.

(56) References Cited

U.S. PATENT DOCUMENTS 5,974,391 A    10/1999    Hongawa (Continued)

FOREIGN PATENT DOCUMENTS

JP    05-084373    4/1993

(Continued)

*Primary Examiner*—Leo Picard
*Assistant Examiner*—Charles Kasenge
(74) *Attorney, Agent, or Firm*—Westerman, Hattori, Daniels & Adrian, LLP.

(57) ABSTRACT

In an apparatus for generating and managing production processing structure in a production management system of a factory, the structure of factory made up of the names or other identifiers of process points obtained by subdividing the factory production line is hierarchically registered in the storage device of the management computer (server; S200), the terminal computers and devices used in production are registered as terminal devices (S202), and tasks (from among tasks generated in advance and stored in the disk of the management computer) for achieving the operation or processing to be implemented at the process points are selected for each process point and registered in the order of execution (S204), while linking the terminal devices with definition information that correlates them, once the terminal computers are activated, the registered tasks are executed by the management computer (server) based on the definition information thus registered, so that the production record information is accumulated, production instructions are distributed to the devices based on the accumulated production record information, such that the product is produced. With this, the number of man-hours and the costs of developing the production management system in building a factory can be significantly reduced, and the turn-around time can be shortened.

8 Claims, 16 Drawing Sheets

U.S. PATENT DOCUMENTS

| | | | |
|---|---|---|---|
| 6,801,822 B1* | 10/2004 | Fujiwara et al. | 700/108 |
| 2003/0069659 A1* | 4/2003 | Wada et al. | 700/108 |
| 2003/0149503 A1* | 8/2003 | Kawase et al. | 700/99 |

FOREIGN PATENT DOCUMENTS

| | | |
|---|---|---|
| JP | 5-84373 A | 4/1993 |
| JP | 06-110530 | 4/1994 |
| JP | 6-110530 A | 4/1994 |
| JP | 11-154174 | 6/1999 |
| JP | 11-154174 A | 6/1999 |

* cited by examiner

FIG. 7

| Table | Site Name | Plant | Div. Name | Line Name | Process Point Name | Process Point ID |
|---|---|---|---|---|---|---|
| Site | HXY | | | | | |
| Plant | HXY | Frame | | | | |
| | HXY | Engine | | | | |
| Division | HXY | Engine | AE | | | |
| | HXY | Frame | WE | | | |
| | HXY | Frame | PA | | | |
| | HXY | Frame | AF | | | |
| | HXY | Frame | VQ | | | |
| Line | HXY | Engine | AE | AE-ON | | |
| | HXY | Frame | WE | WE-ON | | |
| | HXY | Frame | PA | PA-ON | | |
| | HXY | Frame | PA | Sealer | | |
| | HXY | Frame | PA | Top-Coat | | |
| | HXY | Frame | PA | PBS | | |
| | HXY | Frame | AF | AF-ON | | |
| | HXY | Frame | AF | Engine-Load | | |
| | HXY | Frame | VQ | VQ-ON | | |
| | HXY | Frame | VQ | VQ-OFF | | |
| Process Point | HXY | Engine | AE | AE-ON | AE-ON | PP10017 |
| | HXY | Engine | AE | AE-ON | AE-OFF | PP10205 |
| | HXY | Frame | WE | WE-ON | WE-ON | PP10038 |
| | HXY | Frame | WE | WE-ON | WE-OFF | PP10041 |
| | HXY | Frame | PA | PA-ON | PA-ON | PP10042 |
| | HXY | Frame | PA | Sealer | Sealer | PP10043 |
| | HXY | Frame | PA | Top-Coat | Top-Coat | PP10045 |
| | HXY | Frame | PA | PBS | PBS-IN | PP10138 |
| | HXY | Frame | PA | PBS | PA-OFF | PP10109 |
| | HXY | Frame | AF | AF-ON | AF-ON | PP10067 |
| | HXY | Frame | AF | Engine-Load | Engine-Load | PP10072 |
| | HXY | Frame | AF | Engine-Load | AF-OFF | PP10088 |
| | HXY | Frame | VQ | VQ-ON | VQ-ON | PP10089 |
| | HXY | Frame | VQ | VQ-OFF | VQ-OFF | PP10090 |
| | HXY | Frame | VQ | VQ-OFF | VQ-Ship | PP10096 |

FIG. 10

| Application ID | Seq. # | Task Name | Application ID | Seq. # | Task Name |
|---|---|---|---|---|---|
| PP10017 | 1 | AE On | PP10072 | 1 | Scan VIN |
| PP10205 | 1 | Qics AE Repair Task | PP10072 | 2 | Engine Load |
| PP10038 | 1 | WE On | PP10072 | 3 | Distribute |
| PP10038 | 2 | Distribute | PP10088 | 1 | Scan VIN |
| PP10041 | 1 | Tracking | PP10088 | 2 | Check AF On Sequence |
| PP10042 | 1 | Bind VIN vs Smart Eye Task | PP10088 | 3 | Check Duplicate VIN |
| PP10042 | 2 | Tracking | PP10088 | 4 | AF Off |
| PP10043 | 1 | Paint Point | PP10089 | 1 | Vq On |
| PP10043 | 2 | Tracking | PP10090 | 1 | Qics VQ Task |
| PP10045 | 1 | Paint Point | PP10096 | 1 | Scan VIN |
| PP10045 | 2 | Tracking | PP10096 | 2 | Check Duplicate VIN |
| PP10045 | 3 | Count No Of Bakes Task | PP10096 | 3 | Vq Off |
| PP10138 | 1 | Point A Out | PP10096 | 4 | Tracking |
| PP10138 | 2 | Tracking | | | |
| PP10109 | 1 | Point E Out | | | |
| PP10109 | 2 | Tracking | | | |
| PP10067 | 1 | Scan VIN | | | |
| PP10067 | 2 | Check Duplicate VIN | | | |
| PP10067 | 3 | Tracking | | | |
| PP10067 | 4 | Add VIN To AFON Sequence | | | |
| PP10067 | 5 | Calc Lot Pass Task | | | |
| PP10067 | 6 | Set Factoryf News Task | | | |
| PP10067 | 7 | Bonnet Sheet Print | | | |
| PP10067 | 8 | Bonnet Sheet Print2 | | | |
| PP10067 | 9 | Distribute | | | |

FIG. 11

| | Process Point | | | | | | | | | | | | | |
|---|---|---|---|---|---|---|---|---|---|---|---|---|---|---|
| | AE-ON | AE-OFF | WE-ON | WE-OFF | PA-ON | Sealer | PBS-IN | PA-OFF | AF-ON | E-Load | AF-OFF | VQ-ON | VQ-OFF | VQ-Ship |
| AE On | ① | | | | | | | | | | | | | |
| Qics AE Repair Task | | ① | | | | | | | | | | | | |
| WE On | | | ① | | | | | | | | | | | |
| Bind VIN vs Smart Eye Task | | | | | ① | | | | | | | | | |
| Paint Point | | | | | | ① | | | | | | | | |
| Point A Out | | | | | | | ① | | | | | | | |
| Point E Out | | | | | | | | ① | | | | | | |
| Scan VIN | | | | | | | | | ① | ① | ① | | | |
| Engine Load | | | | | | | | | | ② | ② | | | |
| Check AF On Sequence | | | | | | | | | ② | | ③ | | | |
| Check Duplicate VIN | | | | | | | | | | | ④ | | | ② |
| AF Off | | | | | | | | | | | | | | |
| Vq On | | | | | | | | | | | | ① | | |
| Qics VQ Task | | | | | | | | | | | | | ① | |
| Vq Off | | | | | | | | | | | | | | ① |
| Tracking | | | | ① | ② | ② | ② | ② | ③ | | | | | |
| Add VIN To AF ON Sequence | | | | | | | | | ④ | | | | | |
| Calc Lot Pass Task | | | | | | | | | ⑤ | | | | | |
| Set Factoryf News Task | | | | | | | | | ⑥ | | | | | |
| Bonnet Sheet Print2 | | | | | | | | | ⑦ | | | | | |
| Bonnet Sheet Print2 | | | | | | | | | ⑧ | | | | | ③ |
| Count No Of Bakes Task | | | | | | ③ | | | ⑨ | | | | | ④ |
| Distribute | | | | | | | | | | ③ | | | | |

GENERATION/MANAGEMENT APPARATUS OF PRODUCTION PROCESSING STRUCTURE IN FACTORY PRODUCTION MANAGEMENT SYSTEM

TECHNICAL FIELD

The present invention relates to an apparatus for generating and managing production processing structure in the production management system of a newly-built or already-existing factory.

BACKGROUND ART

Factories are often built rapidly in the manufacturing industry to accommodate expanded production. However, since the processing at individual process points has been conventionally developed on a case-by-case basis according to the production process of the factory newly built, this has led to overlapping of development costs. This has been the same when updating the production management system of an existing factory.

In view of this drawback, a technique is disclosed in Japanese Laid-open Patent Application No. 9-267239 relating to the management of product information, wherein the technique is proposed for the comprehensive, waste-free management of information concerning the production or manufacture of products and parts (components).

However, this prior art merely proposes designing process points for producing a product and generating an operational standard, and makes no suggestions on generation and management of production processing structure in the factory production management system.

DISCLOSURE OF THE INVENTION

Therefore, an object of the present invention is to overcome the abovementioned drawbacks, and to provide a generation and management apparatus of production processing structure in the factory production management system, whereby the production processing structure is effectively generated and managed, without inviting development cost overlapping, when a new factory is build or the system of an already existing factory is updated.

In order to achieve the object, the present invention is configured, as defined in claim 1 mentioned below, to have an apparatus for generating and managing production processing structure in a production management system of a factory implemented through a management computer that makes instructions to produce a product and manages production information and terminal computers disposed at production line of the factory, comprising: registering means for, when structure of the factory comprising at least a name for identifying the factory, a name for identifying the product to be produced at the factory or operation to be implemented at the factory, a name of the line in which the product is to be produced or the operation is to be implemented, and names of process points obtained by dividing the line, is inputted by a developer, hierarchically registering the names in a storage device of the management computer; registering means for, when one of the terminal computers and devices to be used in the production or operation of the production line are identified by the developer, registering them as terminal devices in the storage device; registering means for, when a task or tasks for achieving the operation or processing to be executed in the respective process points from among the tasks prepared in advance and stored in a disk of the management computer, is selected and inputted in a sequence of execution for the respective process points by the developer, registering the task or tasks in the storage device; registering means for, when definition information that correlates the registered terminal devices with the operation or processing to be implemented in each of processing steps is inputted by the developer, registering the definition information in the storage device; and task execution means for, when the terminal computers of the terminal devices are activated, allowing the management computer to execute the registered tasks based on the registered definition information to collect production record information of the product and to accumulate the collected production record information.

As recited in claim 2 mentioned below, the task execution means includes: means for activating a control program controlling execution of the tasks such that the control program calls for the task to be executed next from among the tasks registered in the sequence of execution; and allows the management computer to implement the tasks registered in the sequence of execution.

As recited in claim 3, the apparatus further includes: means for registering distribution format for respective distribution destinations to the registered terminal devices when production instruction information based on the production record information is to be distributed to the registered terminal devices and the task execution means allows the distribution destinations to distribute the production instruction information in accordance with the registered distribution format.

As recited in claim 4, the apparatus further includes: means for registering security information concerning use of the terminal devices in the management computer; and the task execution means permits, when each terminal computer of the terminal devices is started up, the start up of the terminal computer, if the computer is operated by the user whose use is permitted by the registered security information.

BRIEF DESCRIPTION OF THE DRAWINGS

FIG. 7 is a diagram showing the tables and other diagrams illustrated in FIG. 5 in list form;

FIG. 10 is a diagram showing the structure of a task list table referred to in the flowchart of FIG. 9;

FIG. 11 is a diagram showing in detail the registration of processing at the process points of the flowchart in FIG. 9;

BEST MODE FOR CARRYING OUT THE INVENTION

A generation and management apparatus of production processing structure in the factory production management system according to an embodiment of the present invention will be described hereinafter with reference to the accompanying figures.

Figure 1:
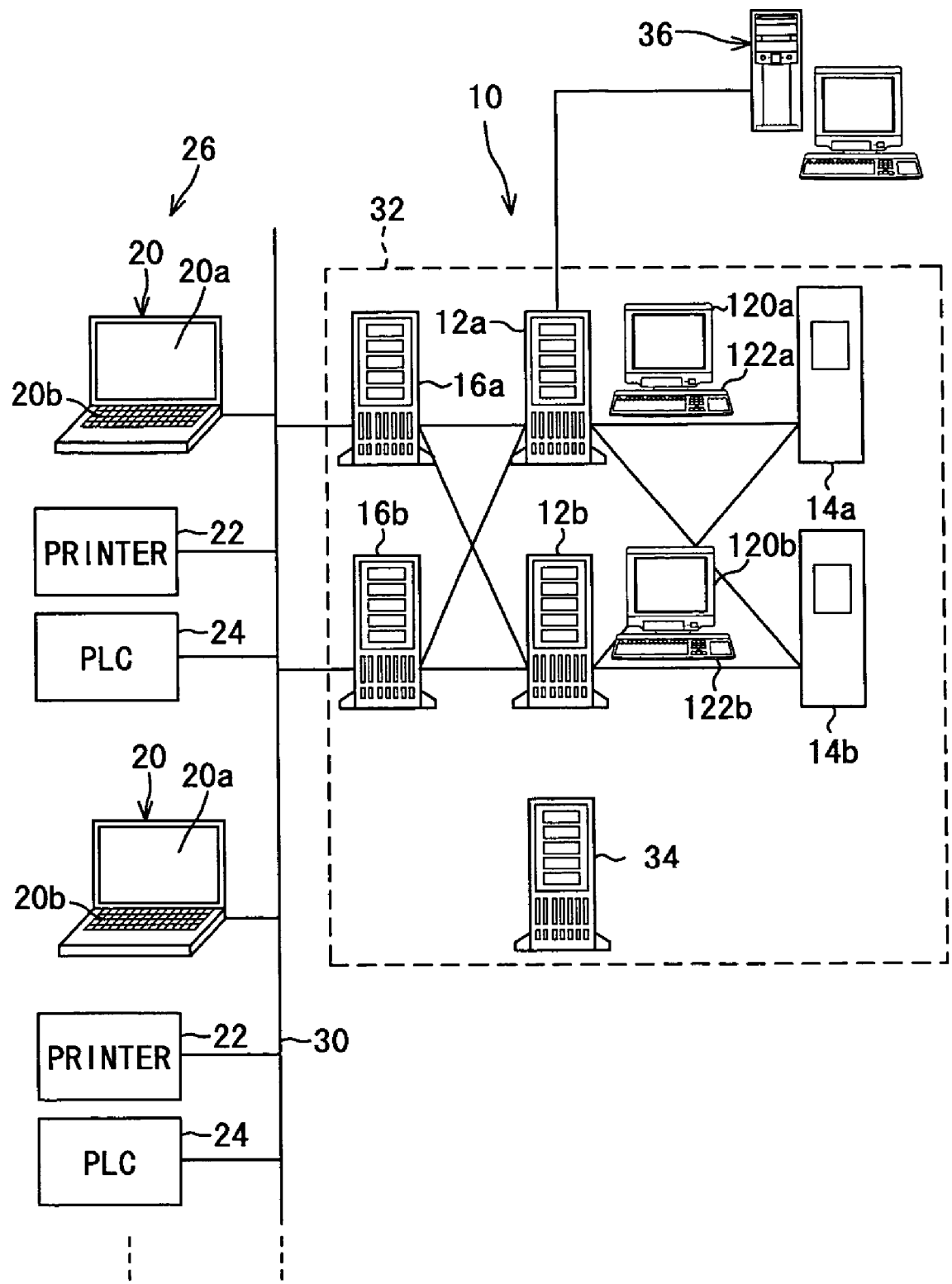
FIG. 1 is a block diagram showing the arrangement of a generation and management apparatus of production processing structure in the factory production management system according to an embodiment of the present invention.

FIG. 1 is a block diagram showing the arrangement of the generation and management apparatus 10 for production processing structure in the factory production management system according to this embodiment.

As shown in the figure, the apparatus 10 is provided with management computers 12a and 12b disposed in the management department of a factory or company headquarters. The management computers 12a and 12b have screens (displays) 120a and 120b and input devices 122a and 122b each composed of a keyboard. The management computers 12a and 12b are connected with a storage (memory) device 14a for storing (registering) the data needed for the processing or operation described hereinafter in a table format (database), a storage (memory) device 14b for storing protocols for transmissions, printers, etc., and network switching computers 16a and 16b and are networked therewith. The components added with the letter "a" above are primary, and those marked with the letter "b" are secondary.

The apparatus 10 is provided with a plurality of terminal computers 20. Each of the terminal computers 20 have a screen (display) 20a and an input device 20b composed of a keyboard, and are disposed at the individual process points (for example, stamping of engine serial numbers, welding, and the like) of the factory production line described hereinafter.

In the vicinity of the terminal computers 20, a printer 22a, a PLC (Programmable Logic Controller) 24 for controlling the operation of operational devices such as the work robots (not shown) that perform engine serial number stamping, welding, and other desired operation, a computer (not shown) for controlling the operation of the operational devices similarly to the PLC and an electronic bulletin board (not shown), etc., disposed to be networked.

The printer 22, the PLC 24, the computer for controlling the operation of operational devices similarly to the PLC, the electronic bulletin board, etc., are referred to by the generic term "devices." Terminal devices 26 are composed of the devices and the terminal computers 20.

The management computers 12a and 12b are connected with each of the terminal computers 20 via an Ethernet 30 and are networked. In the apparatus 10 shown in the figure, the client side is composed of the terminal computers 20, and a server 32 is composed of the management computers 12a and 12b and other components.

The server 32 is provided with a monitoring computer 34, and the monitoring computer 34 monitors the operation of the apparatus 10. Furthermore, the server 32 is connected to a computer 36 that is independent from the network and located at the company headquarters or in the factory management department. The computer 36 generates various kinds of business logic tasks (composed of instructions for operation or processing in program form) described hereinafter, and stores the tasks thus generated in the disks of the management computers 12a and 12b. In the server 32, either the primary or the secondary management computer 12a or 12b is operated by the network switching computers 16a and 16b.

The processing (operation) of the generation and management apparatus of production processing structure in the factory production management system according to this embodiment will next be described.

Figure 2:
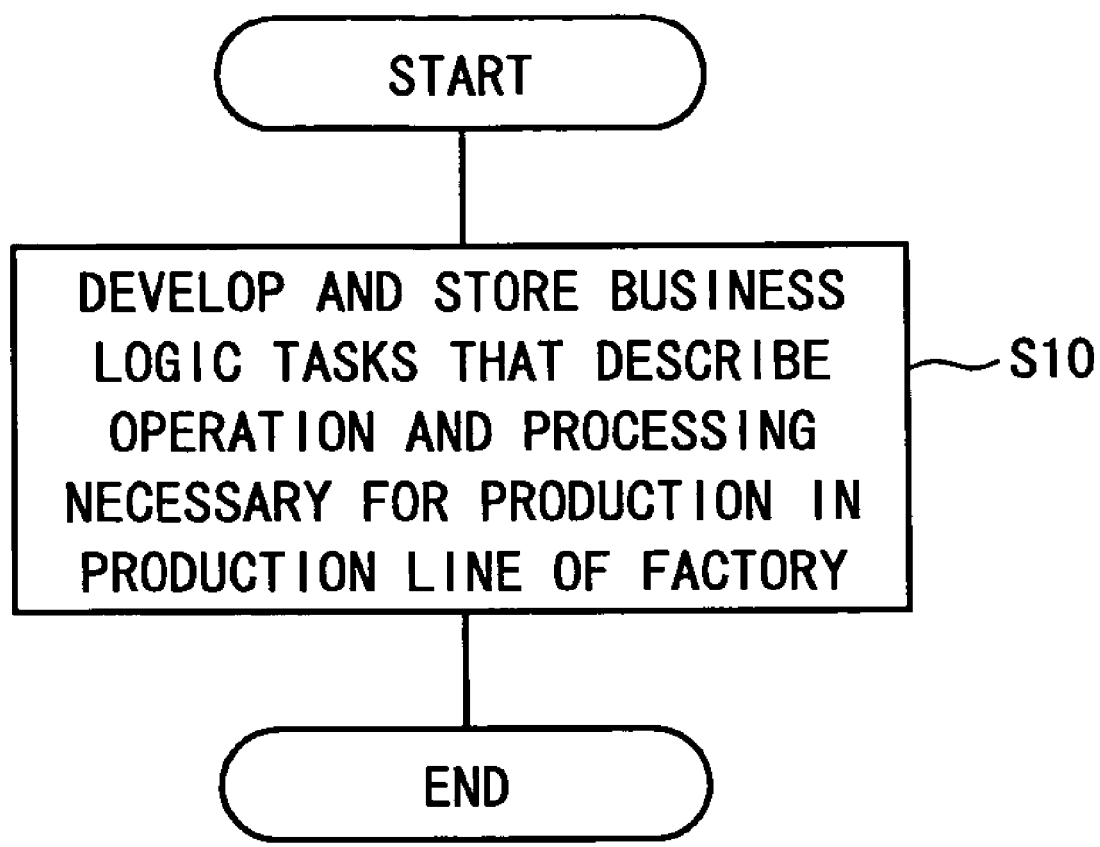
FIG. 2 is a flowchart showing the operation or processing at a preliminary stage of the generation and management apparatus of the production processing structure according to this embodiment.
Figure 3:
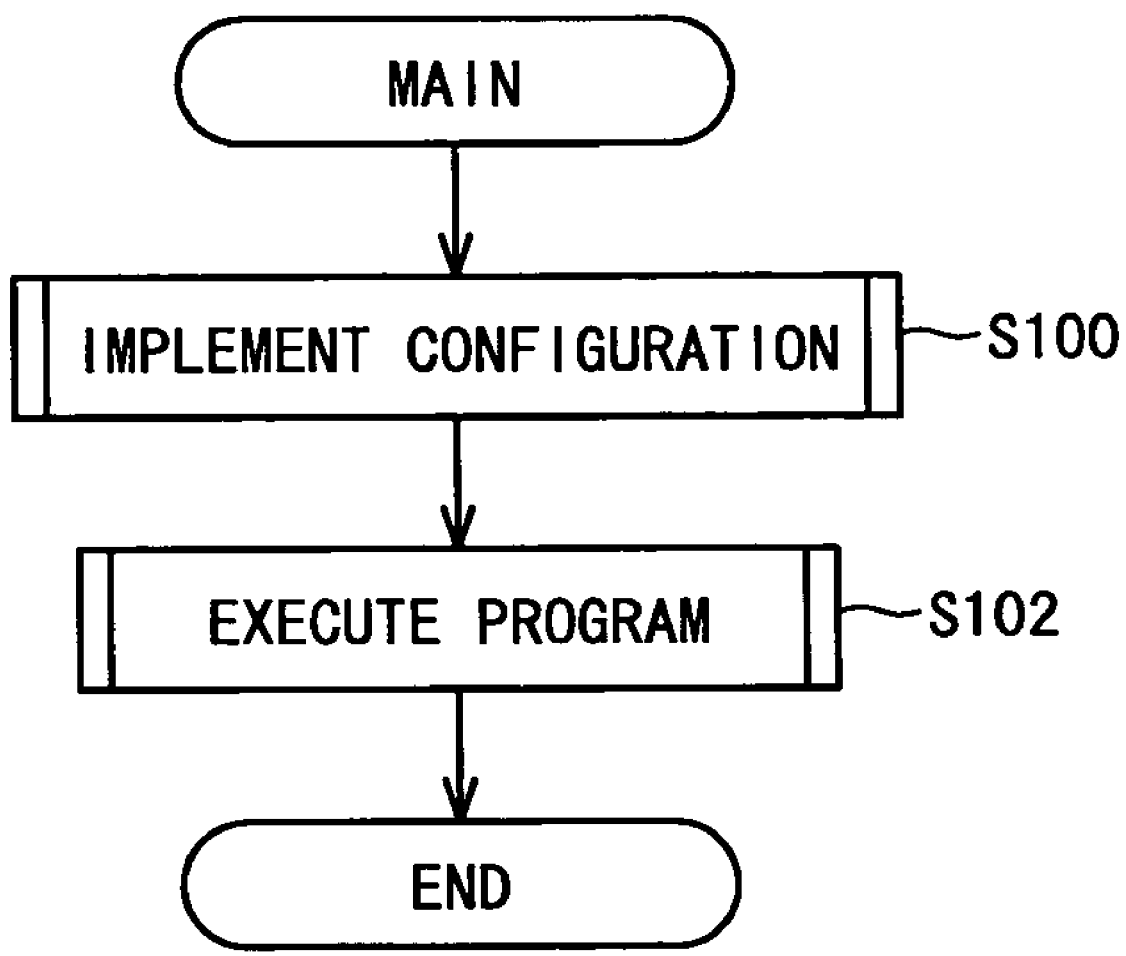
FIG. 3 is a flowchart showing the processing at stages, subsequent thereto, including a preparation stage (introduction) and an implementation stage of the generation and management apparatus of production processing structure according to this embodiment.

FIG. 2 is a flowchart showing the processing of a preliminary stage of the generation and management apparatus of production processing structure, and FIG. 3 is a flowchart showing the processing at stages, subsequent thereto, including a preparation stage (introduction) and an implementation stage of the generation and management apparatus of production processing structure.

In this specification, the phrase "generation and management of production processing structure in the factory production management system" means "to generate and manage production processing structure concerning general production instructions and collection of production records in factory production lines." In other words, the production of a specific product as such is implemented by a lower-order procedure on the basis of a separately determined production schedule.

Explaining this hereinafter, in S10 of the flowchart in FIG. 2, business logic tasks (Business Logic Tasks) describing operation and processing necessary for production in the factory production line(s) are developed and stored on a disk. This development is performed by a developer (designer) using the computer 36 of the apparatus 10.

Thus, in S10, the developer estimates or predicts as many different types of operation or processing as possible that are likely to be needed when a product(s) is produced in the production line(s) of a possible factory, classifies them into minimum units, and develops tasks in program that expresses the operation or processing in each of the minimum units thus obtained.

Specifically, without identifying the factory (no matter which the factory is a newly-built one or any existing one whose production management is to be updated), the developer classifies all of the operation and processing (that will be required in the production processing of the production line(s) of the factory) into minimum units, regardless of what region the factory is built, what product(s) the factory produces and how the factory produces the product(s), and programs the minimum units respectively.

In the generation and management apparatus of production processing structure according to this embodiment, a similar type of object-oriented program to the one used in the aforementioned prior art, is utilized. As defined in the aforementioned prior art, the term "object-oriented" refers to a language aimed at reproducing the humanly identifiable real world as closely as possible in software. The term "object" indicates the unit of processing in which a method expressing the operation between data and data (the operation of the object) is integrated, more specifically, encapsulated.

In contrast with the aforementioned prior art, in the present embodiment, the data are written in relational-type (tabular) tables (databases), and the method is described in program format such that it is configured as an object in the RAM of the management computers 12a and 12b. Since the tasks developed in S10 is a series of execution (operation or processing), the tasks are developed as a method (program).

The operation at stages including the preparation stage (stage at the destination) and the implementation stage of the generation and management apparatus of production processing structure will next be described with reference to the flowchart in FIG. 3. It is assumed that, at this time, the factory, production line, product, etc., are identified and determined. The operation shown in the flowchart of FIG. 3 is implemented using the management computer 12a (or 12b) of the apparatus 10.

Explaining this hereinafter, first, configuration is implemented in S100. The term "configuration" means the structure of the factory, and the "implementation of the configuration" indicates to generate the structure. The operation of this step specifically indicates the operation of defining what is necessary for the production lines of the factory destined.

Figure 4:
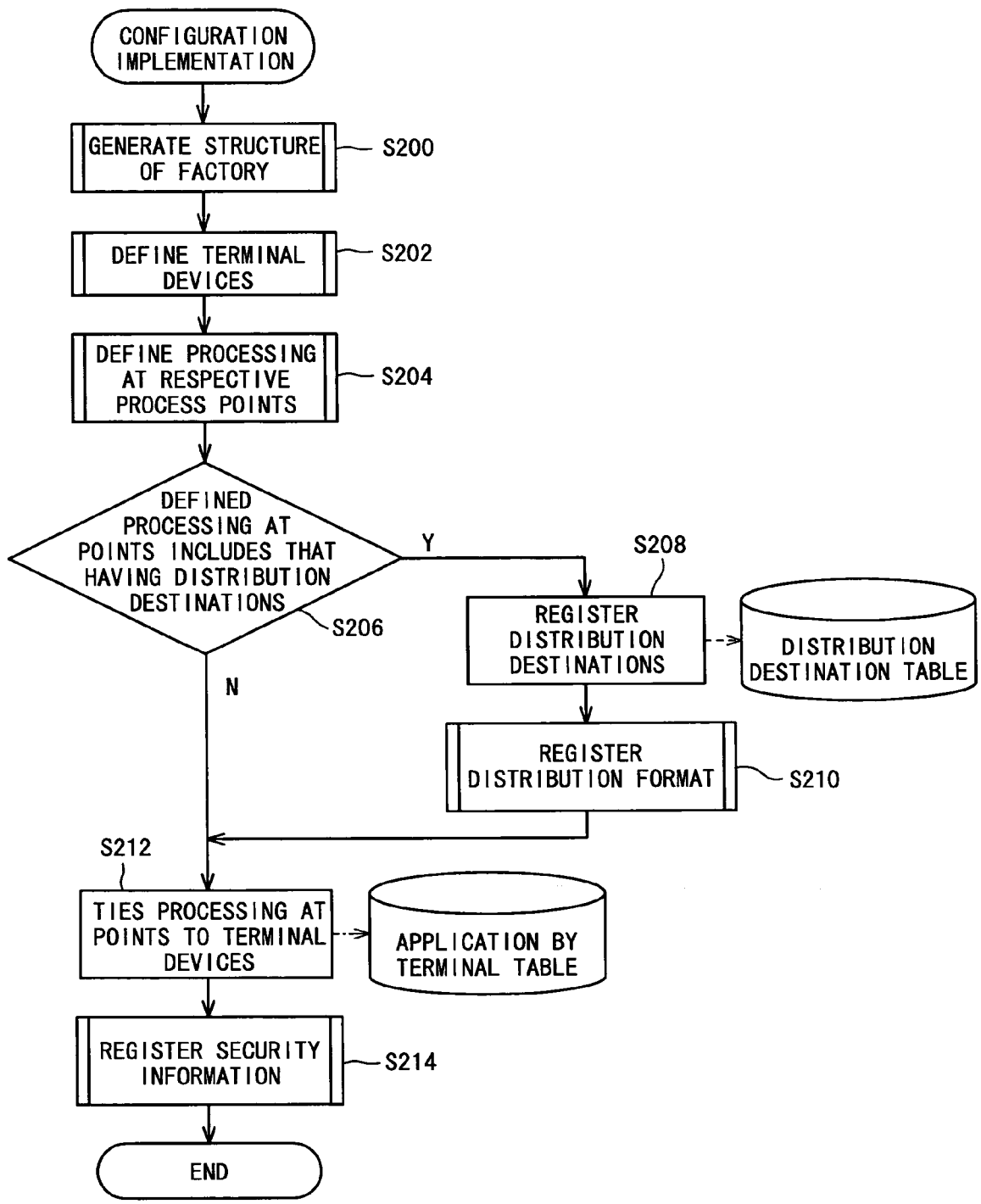
FIG. 4 is a subroutine flowchart showing in detail the generation (implementation of configuration) of factory structure referred to in the flowchart of FIG. 3.

FIG. 4 is a subroutine flowchart showing this processing.

First, in S200, the structure of the newly built (i.e., the destined) factory is generated.

Figure 5:
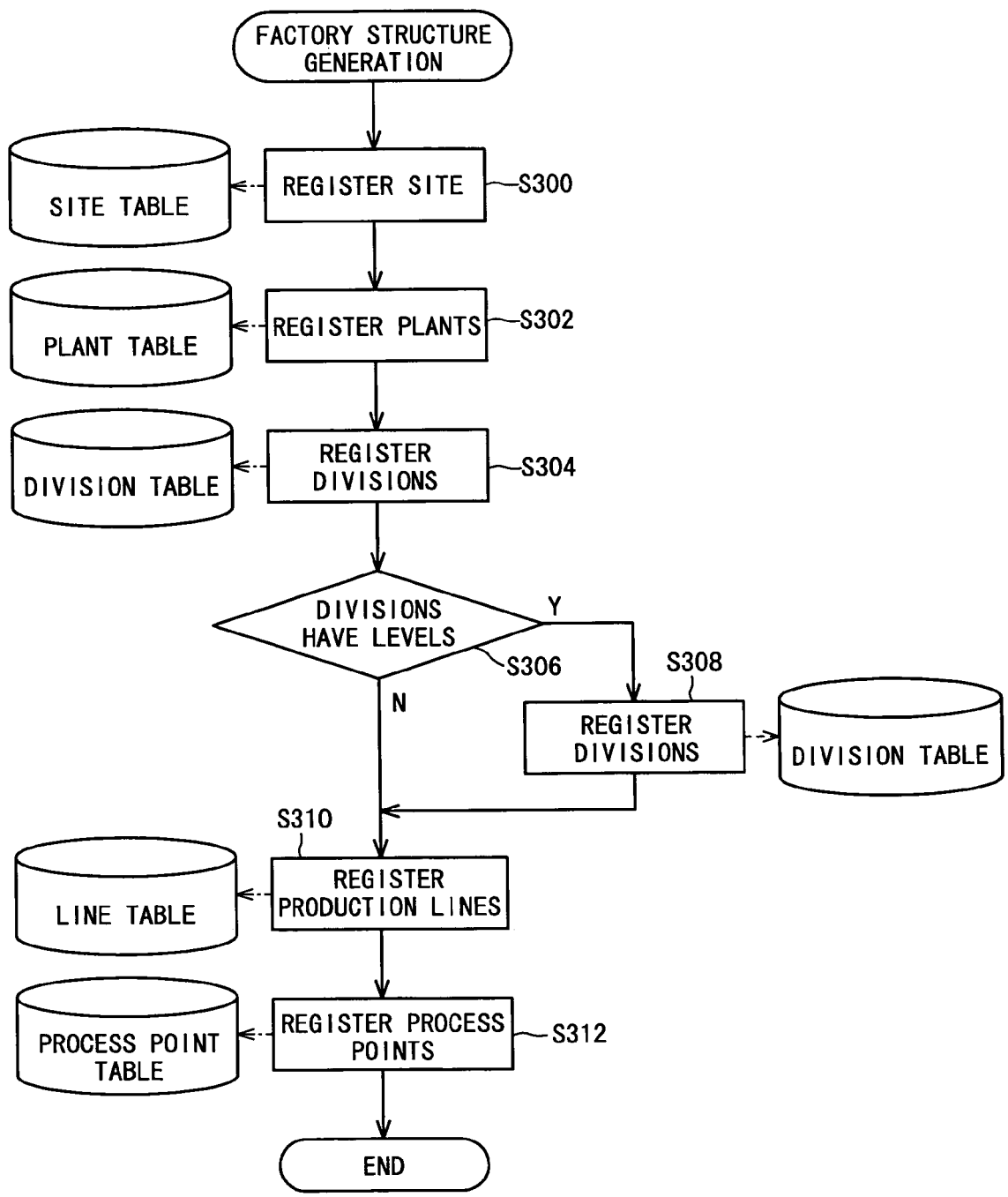
FIG. 5 is a subroutine flowchart showing in detail the generation of the factory structure referred to in FIG. 4.

FIG. 5 is a subroutine flowchart showing this processing.

First, through the operation of the developer via the management computer 12a, when a site is inputted in S300, the site is registered (stored) in the storage device 14a (or 14b). Next, when a plant is inputted in S302, the plant is registered (stored) in the storage device 14a. When a division is inputted in S304, the division is registered (stored) in the storage device 14a.

Figure 6:
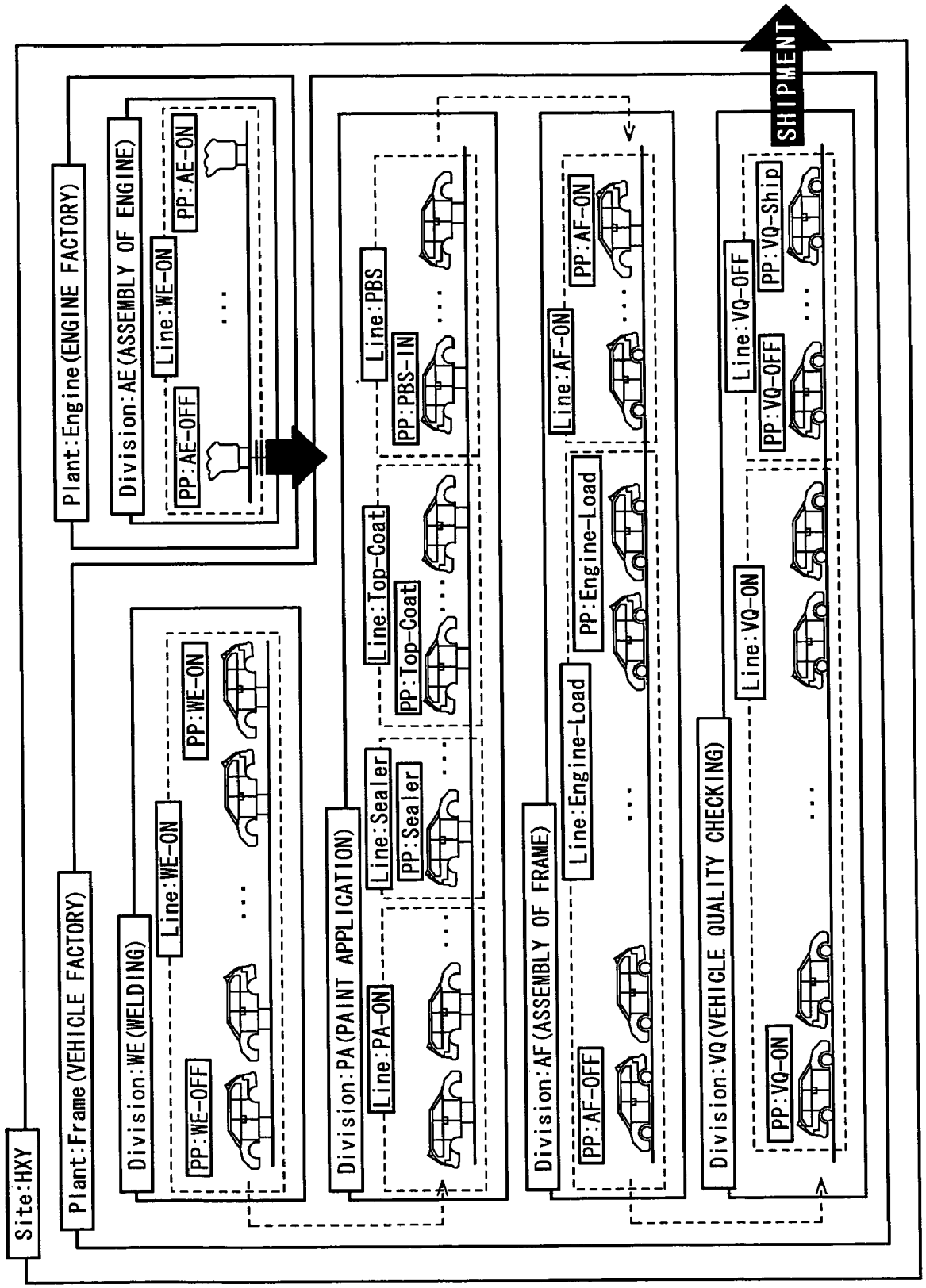
FIG. 6 is a diagram showing the factory structure in an example in which a vehicle (passenger car) is produced.

FIG. 6 is a diagram showing the structure of the factory, taking, as an example, process points to assemble (produce) a vehicle (passenger car) to be shipped. Explaining the above with reference to this figure, the term "site" means the base name, and more specifically indicates the name of the factory location (or corporate name). The term "plant" means the name of the product(s) to be produced at the factory (specifically, the identification as to what the factory is designed to produce). In the illustrated example, it means a frame (for vehicle (passenger car)) and an internal combustion engine thereof. If the site is identified by the corporate name, the plant will be a place name. The "division" (department) refers to a group of process points when classifying them generally or roughly, and when the plant is the frame, it includes WE (welding), PA (paint application (chemical conversion)), AF (assembly of frame), VQ (vehicle quality checking), or the like.

Furthermore, lines (production lines) are provided below each of the division, and below each line, PPs (process points) are disposed. In the example of the figure, below the division PA (paint application), lines PA-ON (paint application on (charging)), Sealer (sealing (coating)), Top-Coat (top-surface coating), and PBS (painted body storage; automatic storage of painted vehicle frames) are disposed. Below the line Sealer, the process point of Sealer (coating) is disposed.

Again explaining the above with reference to FIG. 5, in response to the input, the name of the factory location or the like is registered as the site class (object definition information), more concretely the name of the locality or the like is registered (stored) in S300 in a site table of the storage device 14a as the site class object. Then, in response to the input, for the site registered in S300, a required number of plants (two, including the frame and engine in the example of this figure) are registered (stored) in S302 in a plant table of the storage device 14a as plant class objects.

Then, in response to the input, for the plants registered in S302, a required number of divisions (four for the frame and one for the engine in the example of this figure) are registered (stored) in S304 in a division table of the storage device 14a. Thus, the structure of the factory is hierarchically registered (stored) in the storage device 14a as a tree structure from the site to the divisions.

Then, the developer determines in S306 whether the divisions registered in S304 have a plurality of levels. When the result of this determination is YES, for the divisions registered in S304, the developer again inputs in S308 the required number of divisions (four for the frame and one for the engine in the example of this figure) to be registered (stored) in the division table of the storage device 14a as division class objects in the same manner. S308 is skipped when the result of the determination in S306 is NO.

Then, the developer inputs in S310 the WE-ON and the like in the required number of lines (four in the case of division PA in the example of this figure) for each of the divisions registered as line class objects in S304 and S308, to be registered (stored) in a line table of the storage device 14a.

Then, the developer inputs in S312 a required number of the process points such as the WE-ON (one in the case of Line (line) PA-ON in the example of this figure) as process point (PP) class objects for the lines registered in S310, to be registered (stored) in a process point table of the storage device 14a.

FIG. 7 is a diagram showing these tables in list form. The tables constituting the production line system are thus configured hierarchically. In other words, the apparatus 10 is provided with registering means that, when the factory structure (comprising at least the name for identifying the factory, the name for identifying the product(s) produced at the factory or the operation implemented at the factory, the name of the product(s) or the line(s) in which operation is implemented, and the names of the process points that are a subdivision of the line(s)) is inputted, hierarchically registers these names in the storage device 14a of the management computer 12a.

Returning to the explanation of FIG. 4, in S202, the terminal devices 26 are defined for each of the aforementioned divisions. As mentioned above, the terminal devices 26 are devices comprising the terminal computers 20 and printers 22, the PLC 24, etc.

Figure 8:
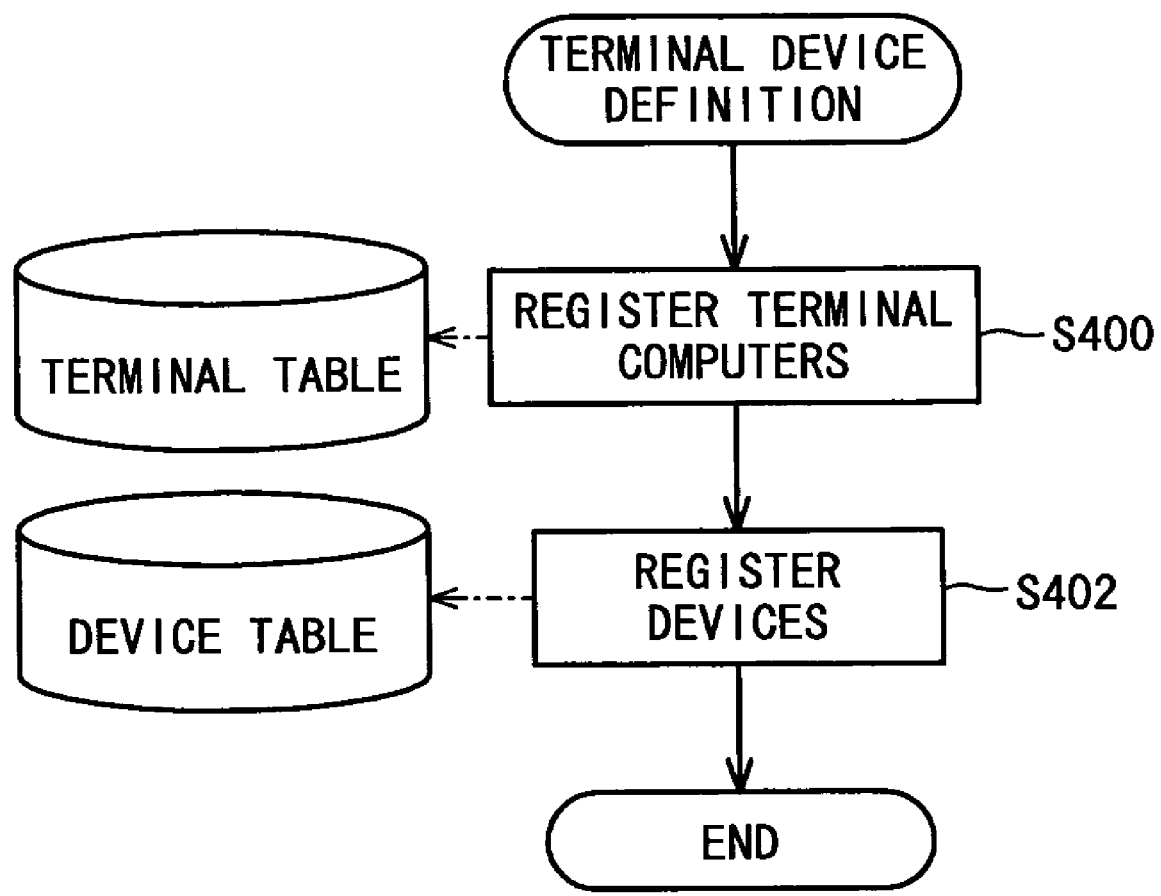
FIG. 8 is a subroutine flowchart showing in detail the definition of terminal devices referred to in the flowchart of FIG. 4.

FIG. 8 is a subroutine flowchart showing this processing.

Explaining this hereinafter, in S400, the developer inputs the terminal computers 20 for the individual divisions registered in S304 and S308 of FIG. 5 by identifying them by their names, etc., and registers them in the storage device 14a. To be more specific, since the terminal computers 20 are disposed at the individual process points, these terminal computers are each registered for each division with an address in a terminal table of the storage device 14a as terminal class objects, for example, for use in division WE.

Then in S402, the developer inputs the devices including the PLC by identifying by their name or the like for the respective divisions registered in S304 and S308 of FIG. 5, to be registered with address in a device table of the storage device 14a as device class objects for the respective divisions in the same manner. Thus, the apparatus 10 is provided with registering means that, when the terminal computers 20 and devices to be used in the production or operation of the production line(s) are identified, registers them as terminal devices in the storage device 14a.

Returning to the explanation of FIG. 4, in S204, the developer defines processing at the individual process points as a menu for each of the terminal computers 20, and in order to achieve the processing at the individual process points defined, inputs necessary tasks (from among the business logic tasks developed in SI 0 of FIG. 2) in a predetermined sequence or order, to be registered in the storage device 14a.

Figure 9:
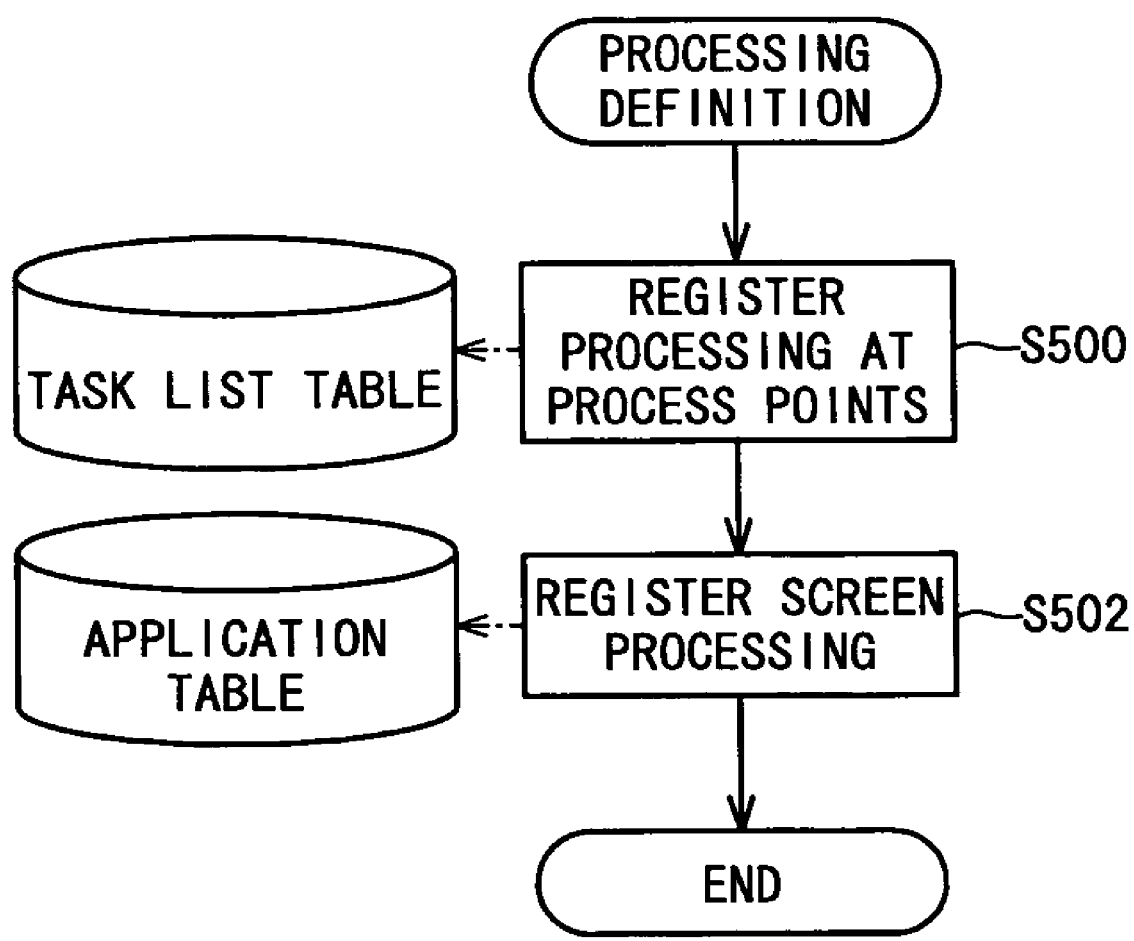
FIG. 9 is a subroutine flowchart showing in detail the definition of processing referred to in the flowchart of FIG. 4.

FIG. 9 is a subroutine flowchart showing this processing.

Explaining this hereinafter, in S500, the developer selects and inputs one or ones from among the business logic tasks registered in S312 of FIG. 5 for the respective process points, in the appropriate sequence or order, more specifically, in accordance with the sequence to be executed, in such a manner that the processing at the process points are achieved, to be registered in a task list table of the storage device 14a.

FIG. 10 is a diagram showing the structure of this table. The table is configured such that PPn (shown in FIG. 7) that is an identifier ID of the process points (PP), and an Application ID that is an identifier ID of the business logic tasks, are assigned with the same value. The Seq.# in the figure shows the order of sequence (execution).

FIG. 11 shows configuration information obtained by the operation of FIG. 9. The business logic tasks of the respective process points (PP) are executed by configuring the tasks in the order of execution as shown in the figure. For example, PP10088 in FIG. 10 indicates "to retrieve a frame number inputted by the operator from the database, to confirm or check the order in the assembly flow, to confirm or check whether the corresponding frame is located in the assembly line, and to implement assembly payout processing".

When a desired task(s) is not included in the business logic tasks developed in S10 of FIG. 2 and not stored in the disk, the developer must newly develop (add) the task(s), store it in the disks of the management computers 12a and 12b, and define (register) it in S204. However, since it is sufficient even in that case if the deficient task(s) is added, the development cost can be reduced and the turnaround time (date of delivery) can be shortened compared to a case in which the all of the tasks are prepared from the beginning.

Returning to the explanation of the flowchart in FIG. 9, next in S502, the developer sets or gives the application ID (in the same manner as the case of the business logic tasks) for screen processing (other than the processing to be performed in the process points mentioned in S500) among menus in the screen of the terminal computers 20, inputs definition information that ties or links the screen to the business logic tasks, and registers the information in an application table of the storage device 14a. Thus, the apparatus 10 is provided with registering means that, when a task or tasks (for achieving the operation or processing to be prosecuted in the respective process points) from among the tasks prepared in advance and stored in the disk of the management computer 12a, is selected and inputted in the sequence or order of execution for the respective process points, registers the task or tasks in the storage device 14a.

Returning to the explanation of FIG. 4, next in S206, the developer determines whether the processing at the individual process points defined in S204 includes that having a distribution destination(s). When the result of this determination is YES, the developer inputs and registers the distribution destinations in S208. Specifically, the developer inputs and registers corresponding devices in a required number from among the terminal devices 26 (terminal computers 20 and devices (mainly the printers 22 or PLCs 24)) registered in S400 and S402 of FIG. 8 for the process points registered in S312 of FIG. 5, as the distribution destinations, by identifying the devices by their name or the like. This is because this operation is needed in determining distribution format explained below.

Then in S210, the developer registers the distribution format, more specifically, definition information thereof.

Figure 12:
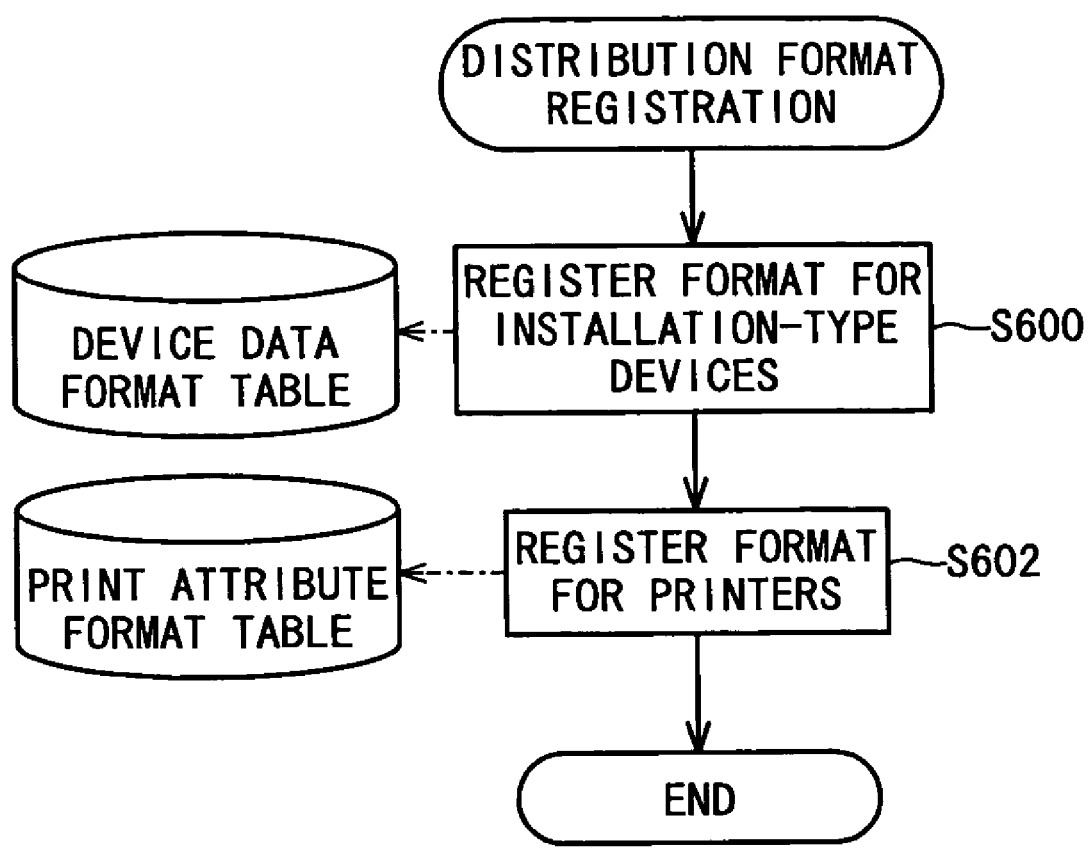
FIG. 12 is a subroutine flowchart showing in detail the registration of distribution formats referred to in the flowchart of FIG. 4.

FIG. 12 is a subroutine flowchart showing this processing.

Explaining this hereinafter, in S600, the developer inputs telegram format of the data to be transmitted for installation-type devices, excluding the printers, from among the devices registered as the distribution destinations in the devices registered in S402 of FIG. 8, specifically, the PLC 24, computers (used to control the work robots and other operational devices), etc., and registers in a device data format table of the storage device 14a. Next in S602, the developer inputs similar information for the printers 22, and registers in a print attribute format table of the storage device 14a. Here, the telegram format of the data to be transmitted means instructions in format indicating the order of data (for example, in the order of frame number, model code, and exterior color) and the number of digits to be allocated for each one of the data.

Returning to the explanation of the flowchart in FIG. 4, then in S212, the developer ties or links the corresponding processing to each of the terminal devices 26 except for the printers. Specifically, the developer inputs definition information that ties or links the processing registered in S500 and S502 of FIG. 9 to each of the terminal computers 20 and devices registered in S400 and S402 of FIG. 8, and registers the definition information in an application-by-terminal table of the storage device 14a. This is specifically done by attaching the application ID to each of the terminal devices 26 in the table. Thus, the apparatus 10 is provided with registering means that, when the definition information that correlates the registered terminal devices 26 with the operation or processing to be implemented in each of processing points is inputted, registers the definition information in the storage device 14a.

Then in S214, the developer registers security information. Specifically, the developer inputs and registers user IDs that are identifiers of users (operators or workers) who use the terminal computers 20, and an access control list (ACL) or other identifiers. In simple terms, this is an operation to determine who can use the terminal computers 20.

Figure 13:
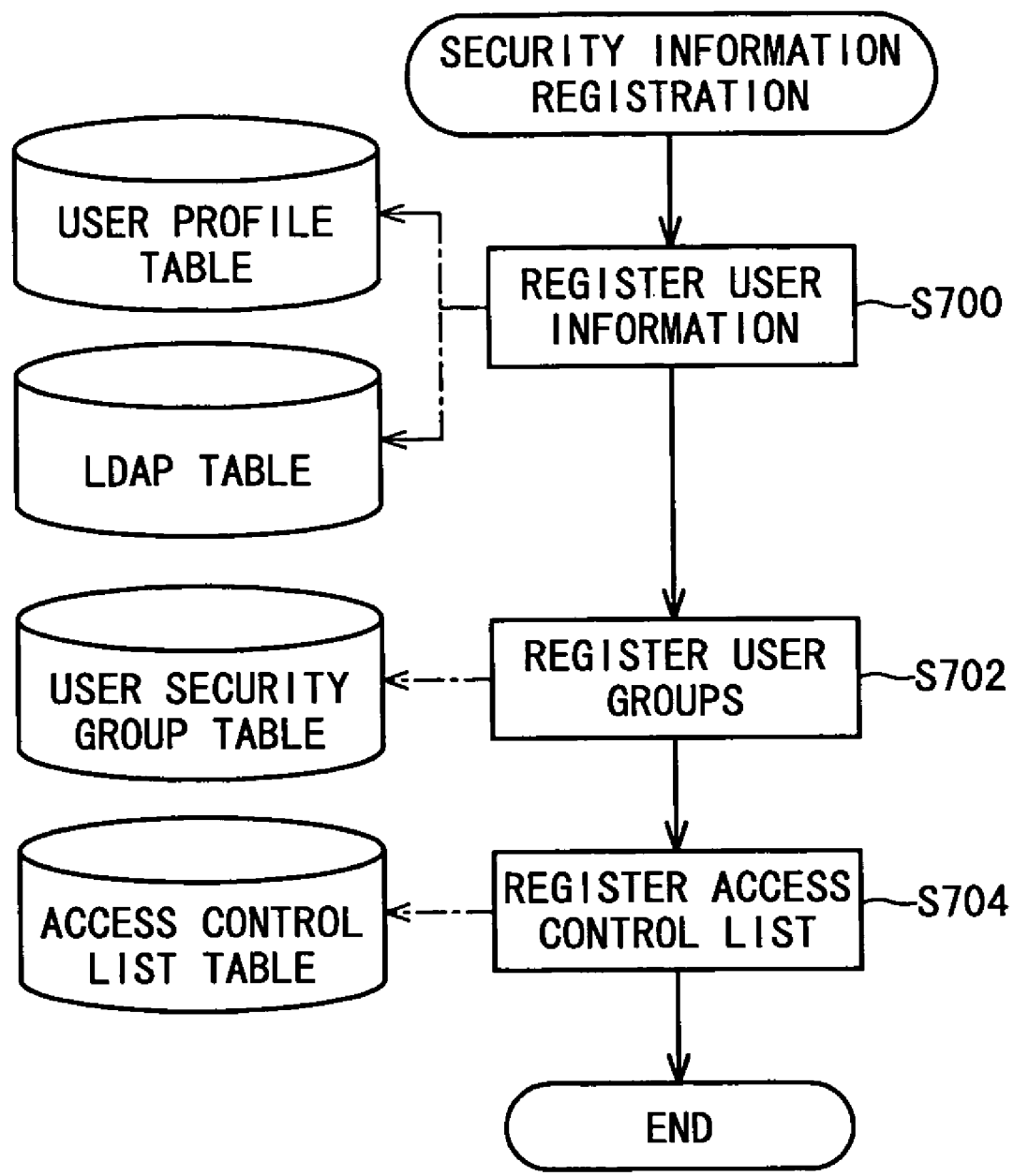
FIG. 13 is a subroutine flowchart showing in detail the registration of security information referred to in the flowchart of FIG. 4.

FIG. 13 is a subroutine flowchart showing this processing.

Explaining this hereinafter, in S700, the developer inputs the user ID and other information relating thereto and registers the same in a user profile table and a LDAP table of the storage device 14a. Then in S702, the developer divides the users registered in S700 to groups (work groups, for example) and inputs the same to be registered in a user security group table of the storage device 14a. Then in S704, the developer inputs the user groups registered in S702 (by their name or the like) as the users who can use corresponding one(s) of the terminal computers 20, and registers the same in the aforementioned access control list (ACL) table of the storage device 14a.

Returning to the explanation of the flowchart in FIG. 3, the implementation of configuration is completed by the processing mentioned above and the preparation stage has been finished, and the production management system for the destined factory has been completed.

In the flowchart of FIG. 3, next in S102 for defining the implementation or execution stage, the program is executed. Specifically, in S100, the program of the production management system thus completed is executed, and operation at each of the production lines is initiated. As mentioned above, the purpose of this production management system is to make general production instructions and to collect production records, and a specific production itself is implemented according to a separate program.

Figure 14:
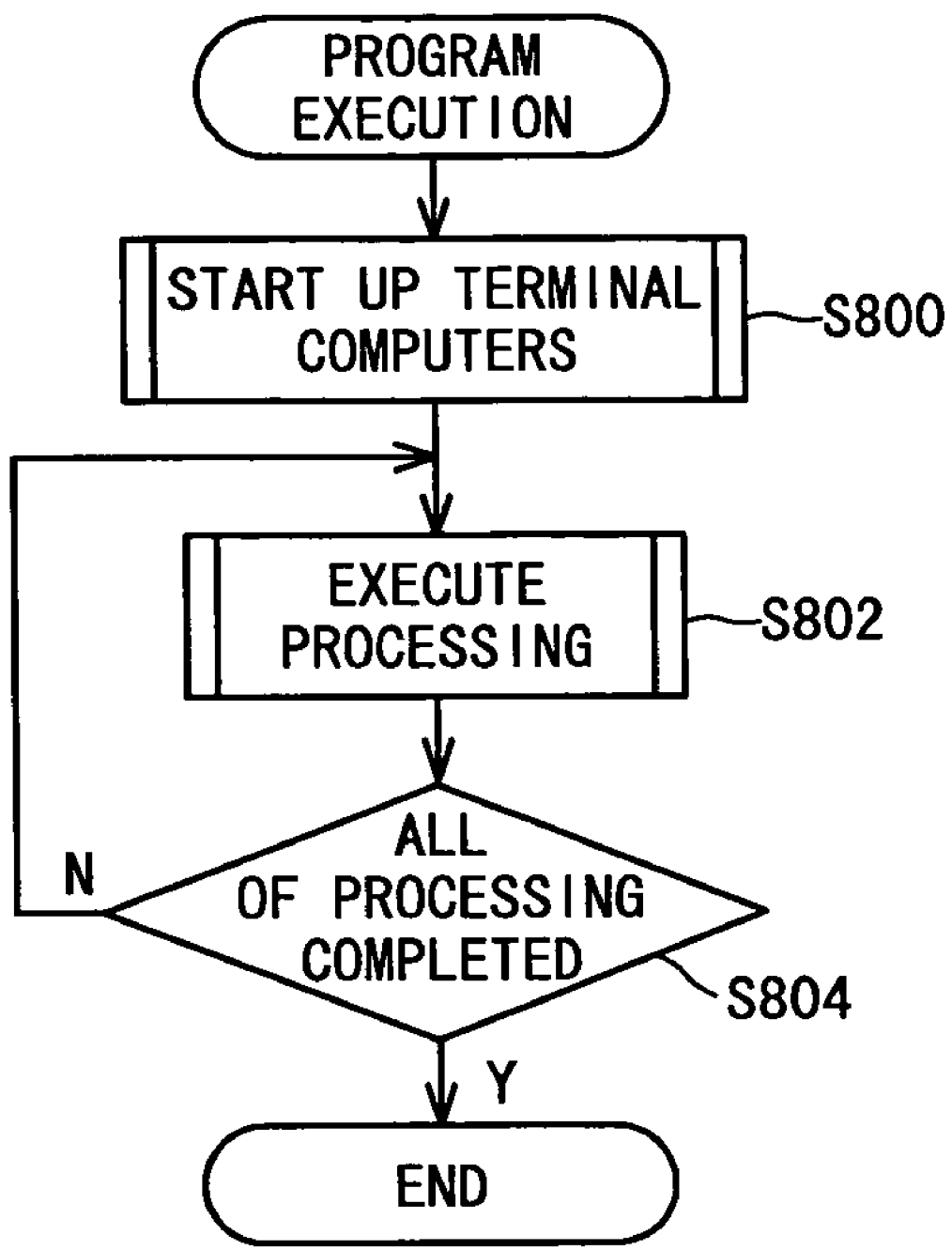
FIG. 14 is a subroutine flowchart showing in detail the execution of program referred to in the flowchart of FIG. 3.

FIG. 14 is a subroutine flowchart showing this processing.

Explaining this hereinafter, in S800, the users start up the terminal computers 20. Specifically, each user starts up corresponding one of the terminal computers 20 disposed at his processing point in his production line, and prepares the execution of processing. The processing of S102 and S800 and onward includes the operation by the users such as startup and input of the user ID, and other human-induced processing, but most of the processing is automatically executed by the apparatus 10.

Figure 15:
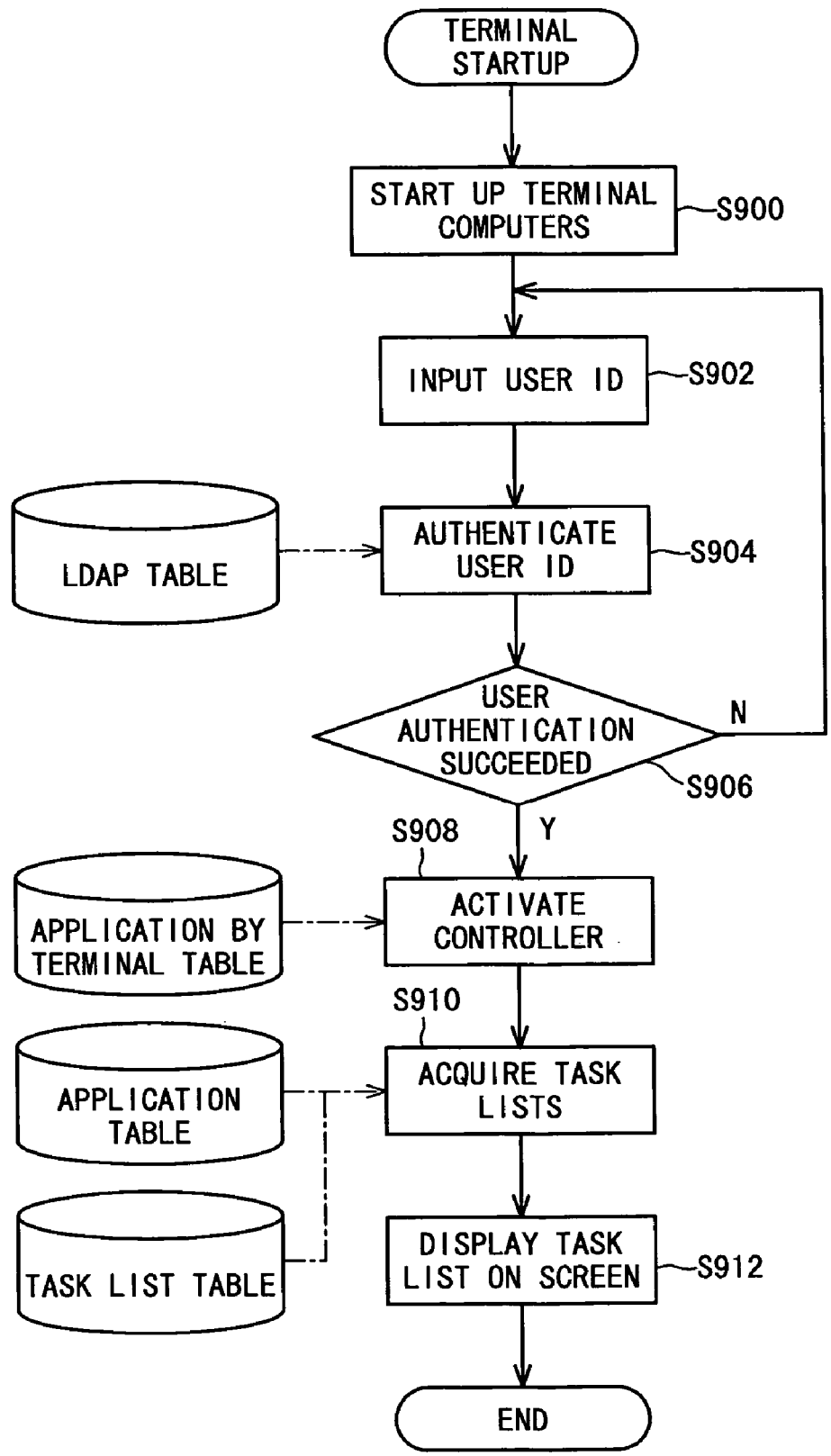
FIG. 15 is a subroutine flowchart showing in detail the terminal startup referred to in the flowchart of FIG. 14.

FIG. 15 is a subroutine flowchart showing this processing.

Explaining this hereinafter, in S900, the users start up the terminal computers 20. The terminal-side program is thereby activated in the terminal computers 20.

Next in S902, each user inputs his aforementioned user ID, whereupon authentication of the user ID is performed in S904. Specifically, this authentication is done as follows: namely, the terminal-side program transmits the ID (identifier) and other terminal information of the terminal computers 20 (started up by the server-side program of the management computer 12a (or 12b)) and the user IDs, and the server-side program retrieves the LDAP table stored in the storage device 14a by the received data. If each user is a person who can use, his use is authenticated.

Then in S906, it is determined whether the user authentication has been succeeded. When the result of this determination is NO, the program returns to S902. When the result of the determination is YES, a controller (control program) is activated. Specifically, the program of the server 32 starts up the controller corresponding to one of the activated terminal computers 20 concerned based on the received terminal information. More specifically, the program of the server 32 generates the controller in the RAM of the management computer 12a (12b). At the same time, the server-side program acquires the information on the processing (tied to the terminal computers concerned) from the application-by-terminal table registered in S212 of FIG. 4, and transmits the information to the controller.

A task list is then acquired in S910. Specifically, the controller thus activated retrieves the application table and task list table registered in S500 and S502 of FIG. 9, acquires the corresponding task list, in other words, the task list corresponding to the one of the terminal computers thus activated, and then displays the task list on the screen of the corresponding one of the terminal computers 20 activated in S912. With this, the users (who started up the terminal computers 20) can recognize the details of the operation visually.

Returning to the explanation of the flowchart in FIG. 14, next in S802, the processing is executed. Specifically, various types of processing are executed from the activated and task-list-displaying terminal computers 20.

Figure 16:
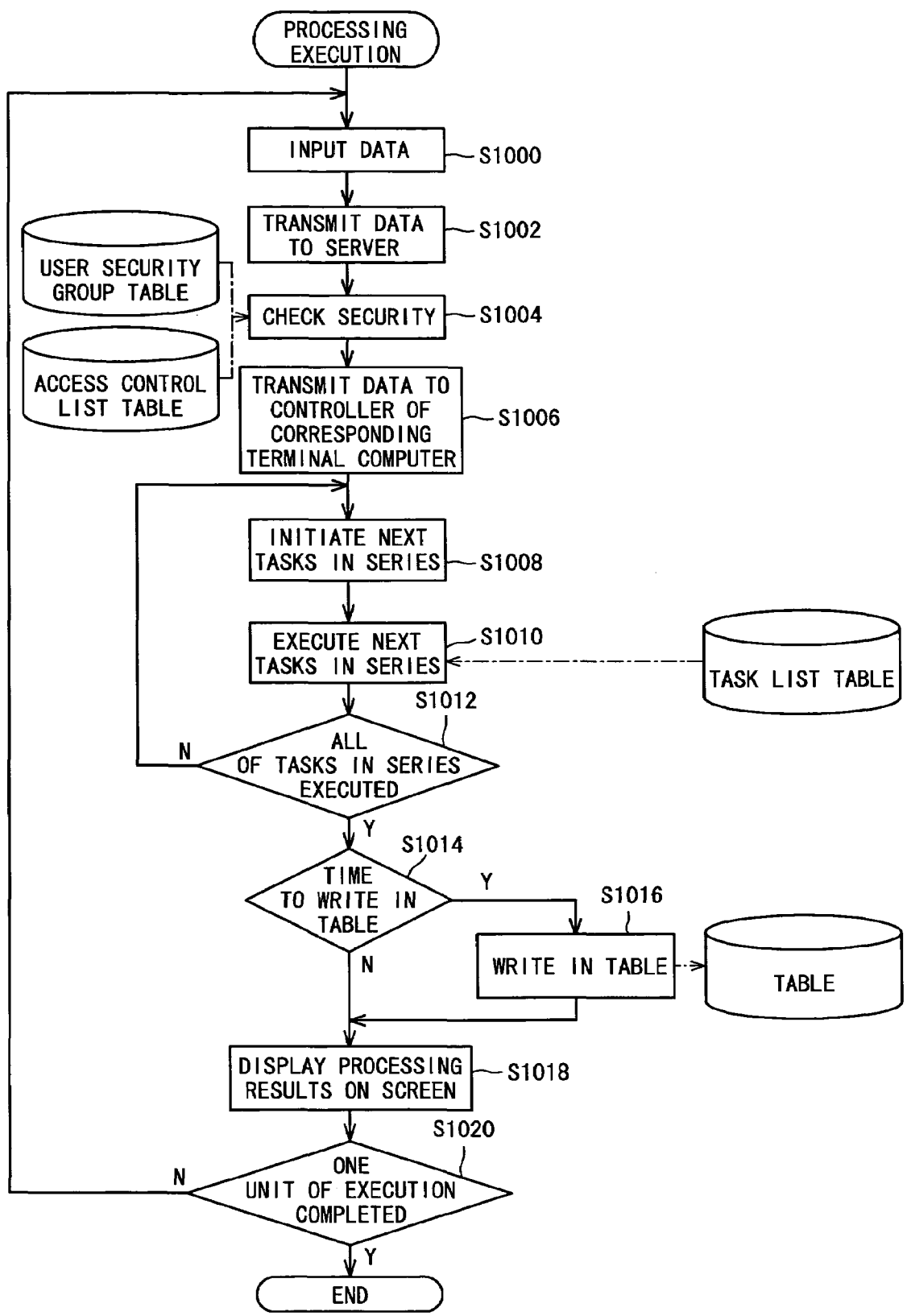
FIG. 16 is a subroutine flowchart showing in detail the execution of processing referred to in the flowchart of FIG. 14.

FIG. 16 is a subroutine flowchart showing this processing.

Explaining this hereinafter, when one of the users inputs processing data (frame number, for example) in S1000, the terminal program transmits the data to the server-side program in S1002. A security check is implemented in S1004 from the user ID and screen ID as to whether the use of corresponding one of the terminal computers 20 is permitted. The server-side program transmits (when use is permitted), in S1006, the input data (frame number or the like) to the controller corresponding to the terminal computer concerned.

Then the controller initiates the next task in S1008. Specifically, the controller selects and initiates the next tasks from among the group of tasks set in the appropriate sequence (i.e. the sequence of execution) and set in the task list table in S500 of FIG. 9 (or the tasks for screen processing other than the processing of the process points set in S502) set in the task list table, and the tasks are executed in S1010. As shown in FIG. 11, in addition to the AEOn (assembly of engine line introduction operation) and other production operation, the tasks include distribution (broadcast), and reading of data stored in the database, or the like.

Then it is determined in S1012 whether the tasks in series have been executed. The term "the tasks in series" means tasks for achieving the processing to be implemented in the process points defined in S500 of the flowchart in FIG. 9, in other words, they correspond to a single round of transactions. Thus, when the controller (control program) is to be generated, since it suffices if the controller is configured to describe such that it can determine whether how far the tasks in series (round of transactions) are executed and which one of tasks remains, without being configured to describe processing specifically, it becomes easy to generate the control program, and, in broader sense, it becomes easy to generate the production management system.

When the result of the determination in S1012 is NO, the program returns to S1008 and the above processing is repeated. When the result is YES, the program proceeds to S1014 in which it is determined whether it is a time to write in the table of the storage device 14a. When the result of this determination is YES, the program proceeds to S1016 in which writing is implemented. S1016 is skipped when the result of the determination in S1014 is NO.

The program next proceeds to S1018 in which the results of processing are displayed on the screen of the corresponding one of the terminal computers, and proceeds to S1020 in which it is determined whether one unit of processing is completed. When the result of this determination is NO, the program returns to S1000. The program is terminated when the result is YES. Thus, the apparatus 10 is provided with task execution means that, when the terminal computers 20 of the terminal devices 26 are activated, allows or causes the management computer 12a to execute the registered tasks based on the registered definition information to collect production record information of the product and to accumulate the collected production record information.

Returning to the explanation of the flowchart in FIG. 14, the program next proceeds to S804 in which it is determined whether all of the processing has been completed. The program returns to S802 when the result of this determination is NO, while the program is terminated when the result is YES.

As mentioned in the above, the embodiment is thus configured to have an apparatus 10 for generating and managing production processing structure in a production management system of a factory implemented through a management computer (server) 12a (12b) that makes instructions to produce a product and manages production information and terminal computers 20 disposed at production line (line) of the factory, comprising: registering means (S100, S200, S300 to S312) for, when structure of the factory comprising at least a name (base name or site) for identifying the factory, a name (plants or divisions, more specifically the both) for identifying the product (engine, frame) to be produced at the factory or operation to be implemented at the factory, a name of the line in which the product is to be produced or the operation is to be implemented, and names of process points obtained by dividing the line, is inputted, hierarchically registering the names in a storage device 14a of the management computer 12a; registering means (S100, S202, S400 to S402) for, when one of the terminal computers and devices (printers 22, PLCs 24, computers, electronic bulletin board) to be used in the production or operation of the production line are identified, registering them as terminal devices 26 in the storage device 14a; registering means (S10, S100, S204, S500 to S502) for, when a task or tasks for achieving the operation or processing to be implement in the respective process points from among the tasks (business logic tasks) prepared in advance and stored in a disk of the management computer 12a (12b), is selected and inputted in a sequence of execution for the respective process points, registering the task or tasks in the storage device 14a; registering means (S100, S212) for, when definition information that correlates the registered terminal devices with the operation or processing to be implemented in each of processing steps is inputted, registering the definition information in the storage device 14a; and task execution means (S102, S800 to S804, S900 to S912, S1000 to S1020) for, when the terminal computers of the terminal devices are activated, allowing the management computer to execute the registered tasks based on the registered definition information to collect production record information of the product and to accumulate the collected production record information.

Thus, it is configured such that, the structure of factory made up of the names or other identifiers of process points obtained by subdividing the factory production line is hierarchically registered in the storage device 14a of the management computer 12a, the terminal computers and devices used in production are registered as terminal devices, and tasks (from among tasks generated in advance and stored in the disk of the management computer) for achieving the operation or processing to be implemented at the process points are selected for each process point and registered in the order in which they are to be executed, while definition information that correlating the tasks to the terminal devices is registered in such a manner that, once the terminal computers are activated, the registered tasks are executed by the management computer (server) based on the definition information thus registered, so that the production record information is accumulated, more specifically, production instructions are distributed to the devices based on the accumulated production record information, such that the product is produced. With this, the number of man-hours and the costs of developing the production management system in building a factory can be significantly reduced, and the turnaround time can be shortened.

Further, it is configured such that, the task execution means includes: means (S908, S1008 to S1012) for activating a control program (controller) controlling execution of the tasks such that the control program calls for (or initiates) the task to be executed next from among the tasks registered in the sequence of execution; and allows or causes the management computer to implement the tasks registered in the sequence of execution.

Thus, since it is configured such that the control program controlling the execution of the tasks is activated and the task to be executed next is selected and called for from among the tasks registered in the sequence of execution to be executed, in other words, when the control program is to be generated, since it suffices if the control program is configured to describe such that it can determine whether how far the tasks in series (round of transactions) are executed and which one of tasks remains, without being configured to describe processing specifically, it becomes possible to create a more universal production management system.

Further, since it is configured such that the apparatus further includes: means (S100, S206 to S210, S600 to S602) for registering distribution format for respective distribution destinations to the registered terminal devices when production instruction information based on the production record information is to be distributed to the registered terminal devices; and the task execution means allows or causes the distribution destinations to distribute the production instruction information in accordance with the registered distribution format, it becomes possible to create a more universal production management system, also.

Furthermore, since it is configured such that the apparatus further includes: means (S100, S214, S700 to S704) for registering security information concerning use of the terminal devices in the management computer; and he task execution means permits, when each terminal computer of the terminal devices is started up, the start up of the terminal computer, if the computer is operated by the user whose use is permitted by the registered security information (S1004, S1006), it becomes possible to improve the security.

It should be noted in the above that, although a factory for producing a finished product such as the vehicle and for producing an intermediate product such as the engine is mentioned as an example of the factory in the above description, the factory may also be a factory that produces parts constituting a final product or intermediate product, or the factory may be that machines parts rather than manufacturing a product.

INDUSTRIAL APPLICABILITY

Since the present invention is configured such that, the structure of a factory (to be introduced) made up of the names or other identifiers of process points is hierarchically registered in the storage device of the management computer, the terminal computers and devices used in production are registered as terminal devices, and tasks (from among tasks generated in advance and stored in the disk) for achieving the operation or processing to be implemented at the process points are selected for each process point and registered in the order executed, while definition information that correlating the tasks to the terminal devices is registered in such a manner that, once the terminal computers are activated, the registered tasks are executed by the management computer based on the definition information thus registered, so that the production record information is collected based thereon, such that the product is produced. With this, the number of man-hours and the costs of developing the production management system in building a factory can be significantly reduced, and the turnaround time can be shortened.

The invention claimed is:

1. An apparatus for generating and managing production processing structure in a production management system of a factory implemented through a management computer that makes instructions to produce a product and manages production information and terminal computers disposed at production line of the factory, comprising:

a. registering means for, when structure of the factory comprising at least a name for identifying the factory, a name for identifying the product to be produced at the factory or operation to be implemented at the factory, a name of the line in which the product is to be produced or the operation is to be implemented, and names of process points obtained by dividing the line, is inputted by a developer, hierarchically registering the names in a storage device of the management computer;

b. registering means for, when one of the terminal computers and devices to be used in the production or operation of the production line are identified by the developer, registering them as terminal devices in the storage device;

c. registering means for, when a minimum unit task or tasks for achieving the operation or processing to be executed in the respective process points from among all minimum unit tasks prepared in advance and stored in a disk of the management computer, is selected and inputted in a sequence of execution for the respective process points by the developer, registering the minimum unit task or tasks in the storage device;

d. registering means for, when definition information that correlates the registered terminal devices with the operation or processing to be implemented in each of processing steps is inputted by the developer, registering the definition information in the storage device; and e. task execution means for, when the terminal computers of the terminal devices are activated, allowing the management computer to execute the registered minimum unit tasks based on the registered definition information to collect production record information of the product and to accumulate the collected production record information.

2. The apparatus according to claim 1, wherein the task execution means includes:

f. means for activating a control program controlling execution of the minimum unit tasks such that the control program calls for the minimum unit task to be executed next from among the minimum unit tasks registered in the sequence of execution;

and allows the management computer to execute the minimum unit tasks registered in the sequence of execution.

3. The apparatus according to claim 1, further including:

g. means for registering distribution format for respective distribution destinations to the registered terminal devices when production instruction information based on the production record information is to be distributed to the registered terminal devices;

and the task execution means allows the distribution destinations to distribute the production instruction information in accordance with the registered distribution format.

4. The apparatus according to claim 1, further including:

h. means for registering security information concerning use of the terminal devices in the management computer;

and the task execution means permits, when each terminal computer of the terminal devices is started up, the start up of the terminal computer, if the computer is operated by the user whose use is permitted by the registered security information.

5. A method of generating and managing production processing structure in a production management system of a factory implemented through a management computer that makes instructions to produce a product and manages production information and terminal computers disposed at production line of the factory, comprising the steps of:

a. hierarchically registering, when structure of the factory comprising at least a name for identifying the factory, a name for identifying the product to be produced at the factory or operation to be implemented at the factory, a name of the line in which the product is to be produced or the operation is to be implemented, and names of process points obtained by dividing the line, is inputted, the names in a storage device of the management computer;

b. registering, when one of the terminal computers and devices to be used in the production or operation of the production line are identified, them as terminal devices in the storage device;

c. registering, when a minimum unit task or tasks for achieving the operation or processing to be executed in the respective process points from among all minimum unit tasks prepared in advance and stored in a disk of the management computer, is selected and inputted in a sequence of execution for the respective process points, the minimum unit task or tasks in the storage device;

d. registering, when definition information that correlates the registered terminal devices with the operation or processing to be implemented in each of processing steps is inputted, the definition information in the storage device; and e. allowing, when the terminal computers of the terminal devices are activated, the management computer to execute the registered minimum unit tasks based on the registered definition information to collect production record information of the product and to accumulate the collected production record information.

6. The method according to claim 5, wherein the step e includes:

f. activating a control program controlling execution of the minimum unit tasks such that the control program calls for the minimum unit task to be executed next from among the minimum unit tasks registered in the sequence of execution;

and allowing the management computer to execute the minimum unit tasks registered in the sequence of execution.

7. The method according to claim 5, further including the step of:

g. registering distribution format for respective distribution destinations to the registered terminal devices when production instruction information based on the production information is to be distributed to the registered terminal devices;

and the step e allows the distribution destinations to distribute the production instruction information in accordance with the registered distribution format.

8. The method according to claim 5, further including the step of:

h. registering security information concerning use of the terminal devices in the management computer;

and the step e permits, when each terminal computer of the terminal devices is started up, the start up of the terminal computer, if the computer is operated by the user whose use is permitted by the registered security information.

* * * * *